United States Patent
Runton

[15] 3,686,384
[45] Aug. 22, 1972

[54] METHOD OF PRODUCING MOLDED ARTICLES FROM COFFEE BEAN HULLS

[72] Inventor: Leslie A. Runton, Canton, Mass.

[73] Assignee: Industrial de Cascarillas-Ciscana S.A., Colombia

[22] Filed: Jan. 22, 1970

[21] Appl. No.: 5,115

[52] U.S. Cl. ................264/122, 106/200, 264/124, 264/237
[51] Int. Cl. .................................................C08h 5/04
[58] Field of Search .264/124, 126; 106/123 LC, 200

[56] References Cited

UNITED STATES PATENTS

| | | | |
|---|---|---|---|
| 2,645,587 | 7/1953 | Williamson | 106/200 |
| 2,388,487 | 11/1945 | Linzell | 264/124 |
| 2,687,556 | 8/1954 | Othmer et al | 264/124 |
| 2,779,683 | 1/1957 | Gill | 264/124 |
| 2,976,164 | 3/1961 | Glab | 264/124 |
| 2,984,579 | 5/1961 | Glab | 264/124 |
| 2,984,580 | 5/1961 | Glab | 264/124 |
| 2,440,789 | 5/1948 | Vande Pyle | 264/331 |

OTHER PUBLICATIONS

Williamson et al. Modern Plastics Vol. 28, No. 8 pages 126, 128, 130 & 187 (1951).
Nabuco et al. Chem. & Eng. News, Vol. 19, No. 16, pages 877–881 (1941).

Primary Examiner—Julius Frome
Assistant Examiner—A. H. Koeckert
Attorney—Nathaniel L. Leek

[57] ABSTRACT

The method of producing molded articles from coffee bean hulls or from rice hulls or from mixtures thereof in which the hulls are grounds dehydrated and molded at a temperature of from 450° to 500° F. and at pressures of from ½ to 10 tons per square inch, whereby the resin component flows to form a resin based molded rigid article.

3 Claims, No Drawings

METHOD OF PRODUCING MOLDED ARTICLES FROM COFFEE BEAN HULLS

This invention relates to the production of molded articles from otherwise waste materials such as the coffee bean endocarp, rice hulls or the like and has for an object to provide a novel and improved process for treating and forming such material.

Another object is to provide a commercially useful process of the above type.

Another object is to provide a molded article of the above type having novel and improved characteristics.

Various other objects and advantages will be apparent as the nature of the invention is more fully disclosed.

The endocarp or the vegetable hulls of coffee beans and of grains such as rice are practically waste products and occur in vast quantities. Most of the waste is burned.

The coffee bean endocarp contains 54 percent cellulose, 27 percent pentosans and 19 percent lignin. Rice hulls are of approximately the same composition except that the cellulose is replaced by 70 percent of silica ($SiO_2$) with attached $H_2O$, defined as a metalloid compound.

The pentosans and lignin in the coffee bean endocarp and in the rice hulls are compatible resins but are difficult and expensive to remove, as would be necessary for making paper or the like. Hence these hulls have been generally discarded as waste materials.

A further object of the present invention is to utilize such waste materials and to convert them into a commercially useful product.

One of the difficulties in processing coffee bean hulls or (endocarp) is that at high temperatures the attached water is driven off as steam which acts as an oxidizing agent to combine with the cellulose to effect carbonization or in some instances to form an explosive mixture. This exothermic reaction takes place at temperatures of 450° F. unless an inhibitor is present. However, a temperature of at least 450° F. is required to produce resin flow which is essential for subsequent forming steps.

Applicant has found that the mixture of about 5 percent of an inhibitor such as a colloid for example finely divided silica or various paint pigments or dyestuffs serves to coat and protect the coffee bean hull particles sufficiently to prevent or at least to raise the temperature at which this exothermic reaction takes place. The particles can then be subjected to the temperatures and pressures required for causing resin flow and producing a molded article.

EXAMPLE I

As a specific example the coffee bean hulls are ground to a size to pass a 50 to 150 mesh screen and then heated to a temperature to drive off the attached water or to dehydrate the particles into a dry state. Such temperature may be of the order of 180° to 400° F. depending upon the length of time involved.

The dehydrated particles may then be mixed with 5 percent by weight of an inhibitor such as silica in the form of a colloid, or ground glass, fiberglass waste, or any other noncombustible mineral in the form of a colloid or dehydrated rice hulls which have been ground to a mesh at least as small as the coffee bean hulls. A melamine resin, a phenolic resin, or a urea-formaldehyde resin may be included.

This mixture is then rapidly heated and cooled in a compression mold up to a temperature of from 450° F. to 500° F. which instantly converts the resin into a flowable state at the peak temperature when it is subjected to a high molding pressure such as from ½ to 10 tons per square inch. At this temperature and pressure and in a short period of time the mixture is compressed into the molded article and the resins from a bond to produce a hard product the texture of which depends upon the fineness of the grind of the hull powder. The ratio of compression is in the order of 3 to 1. Upon rapid cooling, the resins sets to retain its molded form.

Since the high molding pressure causes a rise in temperature of the mixture it is necessary to cool the mold immediately after the mix has reached the peak molding temperature. This may be effected by using press platens having fluid passages through which a hot liquid is first passed for heating a mix and is then followed by a cooling fluid. Also the outer surface of the mold may be sprayed with a cooling liquid such as water fog to assist the cooling step. The mold may be vented to release any vapors and may be coated with a standard releasing agent, such as a silicone or a metal powder, such as molybdenum disulfide.

The product so formed has thermoplastic qualities and is hard and rigid at room temperature and is dimensionally stable. It may, for example comprise a counter top, furniture parts, toilet seat, floor tile, wall board, ceiling tile or other structural parts. A coating of polyvinyl chloride may be applied to produce a finish resembling wood or the like. Pigments and dyestuffs may be added for color.

In the above described process the rice hulls may be ground and dehydrated before incorporating them in the mixture with the coffee bean hulls or they may be ground and separately dehydrated as desired. They may also be used in various proportions depending upon the nature of the desired product. Since the rice hulls are composed of 70 percent silicon dioxide they are less combustible and a larger proportion may be used to reduce carbonization. The silica composition also provides a hard wear resisting surface and is particularly suitable for floor tile or the like.

EXAMPLE II

A mixture of equal parts of coffee endocarp, and rice endocarp has the following composition:
 35 percent Silicon dioxide, $SiO_2$—$H_2O$ a metalloid compound
 27 percent Cellulose
 25 percent Pentosans
 13 percent Lignin This mixture in the form of finely ground particulate is placed in metal molds, which are heated in an oven set at 350°. After 40 minutes in the oven, the molds can be transferred to a press, with platens that are valved to receive either hot or cold oil or steam. The oil is preferred, and should be fed in at 550° F. This produces a temperature rise in the pre-heated molds of 1° per second of time. Therefore in 2 minutes, and 5 seconds the mold will reach 475°. At this point the press is closed, and a pressure of 2 tons per square inch applied. Without delay the valves are changed to allow cold oil to flow into the platens at 80° F., and a temperature decline is attained at the rate of 1° per second of time, so that in 2 minutes and 5 seconds the mold is again at 350° F. However, gas is still present and a further 100° of temperature decline is needed, before the press can be opened. This will take 1 minute and 40 seconds longer. After cooling to room temperature the molded product is removed from the mold, the mold washed and returned to be refilled and reheated for the next cycle.

The time required to rapidly heat and cool the mixture in the mold, if shortened, will permit higher operating temperatures at the peak. One degree Farenheit of temperature change per second of time will permit 5 degrees of extra temperature at the peak without creating an exothermic reaction and carbonization. The delay time at the peak should be kept to less than one minute, and preferably 30 seconds. This can be assisted by a water fog blast directed against the walls of the mold. As the compression ratio of the powder to finished part is 3 to 1, the walls of the mold are a good target for cooling. This procedure will produce good parts, harder than wood, heavier than wood, dimensionally stable, and with good beam strength.

These parts may be modified as follows and for the following reasons:

Color changes can be made by adding small quantities of paint pigments. Brighter colors can be obtained by mixing in finely ground vat colors such as those used to dye cotton.

Surface decoration can be done by sprinkling into the molds before the powder is entered, ground glass or metal powders as used in paints, and lacquers, mica, or any decorative metal or mineral that can resist the heat. Other surface decorations can be obtained by placing aluminum, or copper woven screen wire in the bottom of the mold prior to adding the powder. This shows on the surface of the part and adds both color and decoration.

Metal shavings as they come from machining operations, when washed and cleaned, can be utilized the same way.

For added strength for wallboard, heavy woven wire can be embedded in the middle of the powder mixture. For greater strength in small parts, like toilet seats, fiber glass can be added in laminate form, or mixed in.

When making furniture parts such as drawer fronts which need a deep molding, or a large complex design which is not readily moldable in one pressing because insufficient pressure cannot be developed in the deeper recesses, these can be made separately in special small molds that can make the desired shape. These premolded parts are placed into the final mold so that the surface is reasonably flat. Powder is placed above to fill the mold and being thermoplastic, the parts will melt with the powder when the melting takes place at 475° F., and one solid part with all the deep designs will be produced.

For making hydrophobic parts that are required to be water-proof, a 5 percent addition of a cross-linking resin from the melamine or phenolic groups, or urea/formaldehyde is effective. The coffee endocarp when mixed with 5 percent of an air dried melamine or phenolic resin, which is finely divided due to being sprayed into a hot air blast, will permit the peak temperature of this mixture to reach 480° F., when using the rapid temperature rise and fall technique, already outlined. However it is necessary to spread the resin over every particle of the finely ground coffee endocarp.

It will be seen that this process can make many useful products from a waste material in a simple economical and quick way.

What is claimed is:

1. The process for producing a molded article from coffee bean hulls which comprises comminuting the coffee bean hulls to a size to pass through a 50 to 150 mesh screen, dehydrating the comminuted hulls by heating the same to a temperature of from 180° to 400° F., incorporating with the dehydrated hulls about 5 percent by weight of a combustion inhibitor comprising a siliceous material to provide a molding mixture, Preheating the mixture in a compression mold to a temperature of from 450° to 500° F., closing the mold and compressing the mixture by applying pressure of from ½–10 tons per square inch while cooling in the mold to the preheating temperature, the said compressing and cooling in the mold being effected in a period not exceeding 30 seconds, for forming the desired article.

2. The method set forth in claim 1 in which the siliceous material is in the form of comminuted rice hulls.

3. The method set forth in claim 1 in which the mixture further contains about 5 percent of a cross linking resin selected from the group of melamine resins, phenolic resins, or urea-formaldehyde resin.

* * * * *